US009798791B1

(12) United States Patent
Zhang et al.

(10) Patent No.: US 9,798,791 B1
(45) Date of Patent: Oct. 24, 2017

(54) SYSTEM AND METHOD FOR FILTERING FILES DURING DATA REPLICATION

(71) Applicant: CA, Inc., Islandia, NY (US)

(72) Inventors: Haiyang Zhang, Beijing (CN); Victor Liu, Beijing (CN); Xiaopin Wang, Beijing (CN); Lei Huang, Beijing (CN)

(73) Assignee: CA, Inc., New York, NY (US)

( * ) Notice: Subject to any disclaimer, the term of this patent is extended or adjusted under 35 U.S.C. 154(b) by 222 days.

(21) Appl. No.: 14/097,169

(22) Filed: Dec. 4, 2013

(51) Int. Cl.
G06F 7/00 (2006.01)
G06F 17/00 (2006.01)
G06F 17/30 (2006.01)

(52) U.S. Cl.
CPC .............................. *G06F 17/30575* (2013.01)

(58) Field of Classification Search
CPC ......... G06F 17/30575; G06F 17/30174; G06F 17/30581; H04L 67/1095; H04L 67/1097
USPC ......................................................... 707/610
See application file for complete search history.

(56) References Cited

U.S. PATENT DOCUMENTS

| 7,392,421 | B1 * | 6/2008 | Bloomstein | G06F 11/1482 |
| | | | | 714/4.4 |
| 7,941,556 | B2 * | 5/2011 | Canali | H04L 29/06 |
| | | | | 370/351 |
| 7,949,843 | B1 * | 5/2011 | Jiang | G06F 11/1451 |
| | | | | 707/649 |
| 7,962,455 | B2 * | 6/2011 | Erofeev | G06F 17/30212 |
| | | | | 707/671 |
| 8,180,730 | B2 * | 5/2012 | Thakore | G06F 17/30371 |
| | | | | 707/618 |
| 2005/0182773 | A1 * | 8/2005 | Feinsmith | G06Q 10/10 |
| 2005/0188248 | A1 * | 8/2005 | O'Brien | G06F 3/0607 |
| | | | | 714/5.11 |
| 2006/0047713 | A1 * | 3/2006 | Gornshtein | G06F 17/30575 |
| 2007/0276838 | A1 * | 11/2007 | Abushanab | G06F 17/30067 |
| 2008/0256138 | A1 * | 10/2008 | Sim-Tang | G06F 11/1435 |
| 2010/0145909 | A1 * | 6/2010 | Ngo | G06F 11/1471 |
| | | | | 707/611 |
| 2010/0223232 | A1 * | 9/2010 | Wakefield | G06F 11/1662 |
| | | | | 707/634 |
| 2011/0213781 | A1 * | 9/2011 | Hansel | G06F 17/30578 |
| | | | | 707/741 |
| 2011/0282843 | A1 * | 11/2011 | Wang | G06F 11/1466 |
| | | | | 707/649 |
| 2011/0295796 | A1 * | 12/2011 | Muhunthan | G06F 17/30575 |
| | | | | 707/610 |
| 2011/0295806 | A1 * | 12/2011 | Erofeev | G06F 11/1435 |
| | | | | 707/634 |

(Continued)

OTHER PUBLICATIONS

Zhang, H. et al., "System and Method for Restoring Data", U.S. Appl. No. 13/916,938, filed Jun. 13, 2013.

*Primary Examiner* — Hosain Alam
*Assistant Examiner* — Nicholas Allen
(74) *Attorney, Agent, or Firm* — Coats & Bennett, PLLC

(57) ABSTRACT

During a synchronization phase of a replication process, a master server generates and saves a shadow copy of pre-defined files to one or more replica servers so as to synchronize the files on both servers. Thereafter, during a replication phase of the replication process, the master server supplements the shadow copy with copies of individual files that have been modified. Each replica server is associated with a filter that controls which of the modified individual files, if any, is sent from the master server to that replica server for storage.

20 Claims, 4 Drawing Sheets

(56) References Cited

U.S. PATENT DOCUMENTS

| | | | |
|---|---|---|---|
| 2011/0307657 A1* | 12/2011 | Timashev | G06F 11/1451 711/112 |
| 2012/0036161 A1* | 2/2012 | Lacapra | G06F 17/30194 707/781 |
| 2012/0066179 A1* | 3/2012 | Saika | G06F 3/061 707/634 |
| 2012/0123999 A1* | 5/2012 | Ashutosh | G06F 11/1453 707/618 |

* cited by examiner

SYSTEM AND METHOD FOR FILTERING FILES DURING DATA REPLICATION

BACKGROUND

The present disclosure relates generally to data replication systems, and more particularly to a system and method for replicating the data from a master server to a replica server to synchronize the data on those servers.

There are a number of currently existing software packages that allow users to replicate their data to improve reliability, increase accessibility, and support fault-tolerance. Generally, these systems make a "shadow copy" of the data and files maintained on a so-called "master server," and send that shadow copy to a so-called "replica server." The system then continuously updates the shadow copy by sending copies of the data and files as they are modified or changed to the replica server. Thereafter, if the master server fails or its data is destroyed or lost, the replica server may be employed as the master server. Alternatively, a user may restore the data and files on the master server using the data and files stored at the replica server.

BRIEF SUMMARY

The present disclosure provides a method and apparatus for replicating the data and files stored on a master server to one or more replica servers so as to synchronize the data and files on master and replica servers. Particularly, a replication process has two phases—an initial synchronization phase and an on-going replication phase. During the initial synchronization phase, the master server generates a shadow copy of predefined files (e.g., application files, data files, directories, folders, etc.) and saves those files to the replica servers. Thereafter, during the replication phase, the master server continuously supplements the shadow copy with copies of individual files that have been modified after the shadow copy has been generated. This process ensures that the replica servers always have an up-to-date "mirror image" of the data contained on the master server. In the event that the master server ever loses its data, or fails such that it can no longer perform its intended functions, the replica servers could function as the master server. Alternatively, the supplemented shadow data on the replica servers may be used to restore the current state of the master server, if needed.

In one embodiment of the present disclosure, the master server stores a configuration file in a memory circuit. The configuration file identifies which files are to be sent to the replica servers as part of the replication process, and also identifies a plurality of filters. Each filter is associated with and corresponds to a different one of the replica servers that are connected to the master server via a communication network. The master server also includes, or has access to, a journal file. The journal file comprises information indicating which of the predetermined files identified in the configuration file have been modified since the master server generated the shadow copy.

In one embodiment, the master server updates the journal file to identify the predetermined files that have been changed or modified since the shadow copy was generated, and filters the journal file through each of the plurality of filters. Each filter comprises information that defines whether a given predetermined file is to be sent to its corresponding replica server. Based on the filter information, the master server sends, or excludes from sending, a current copy of the predetermined file from the master server to the replica server that is associated with the current filter.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
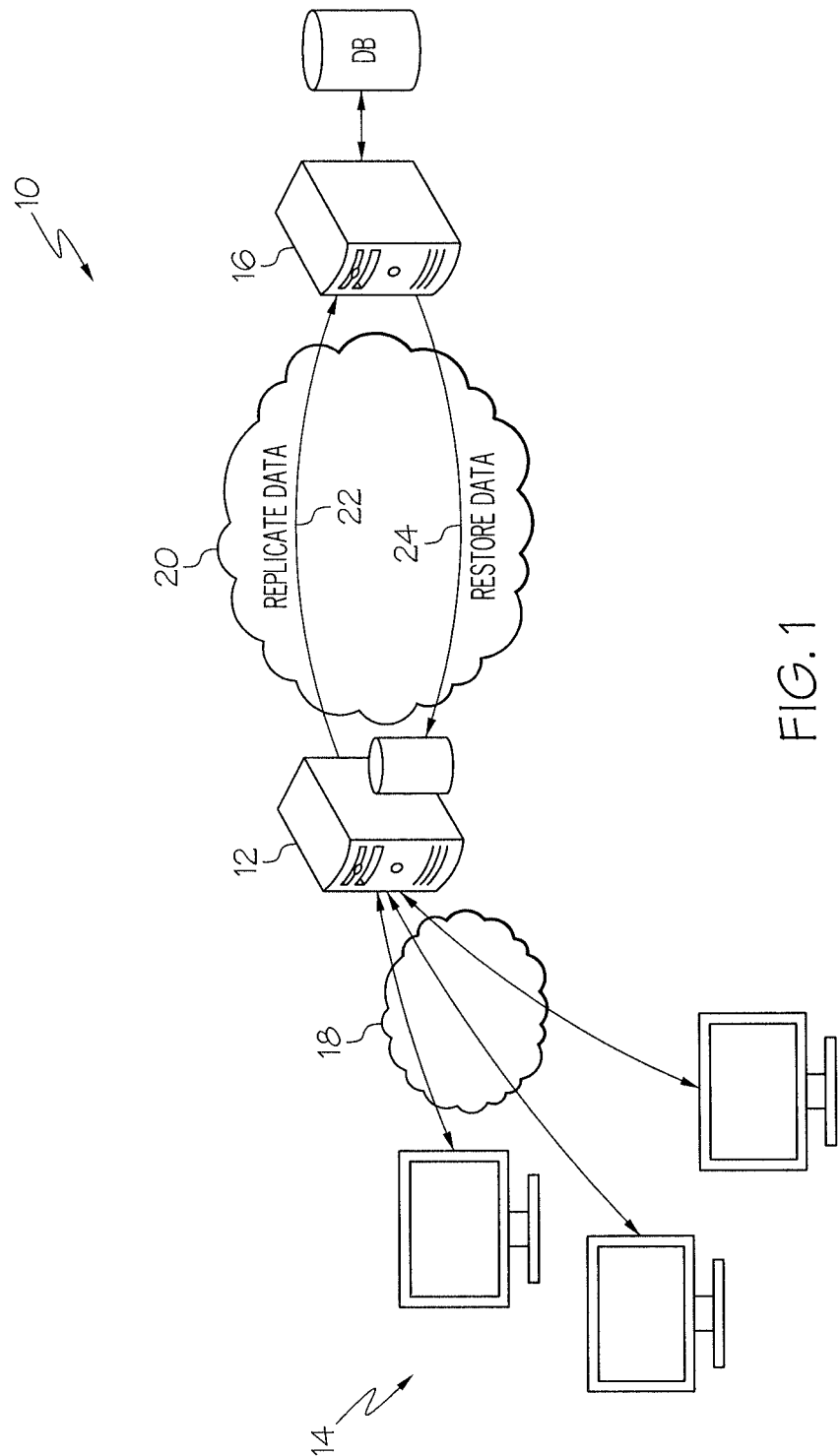
FIG. 1 is a block diagram illustrating some components of a communication system configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system and corresponding computer-implemented method for replicating the files stored on a master server to one or more replica servers so as to synchronize the files between those servers. Particularly, during an initial synchronization phase, a shadow copy of predefined files (e.g., application files, data files, directories, folders, etc.) resident on the master server is generated by the master server and copied or backed-up to one of more of the replica servers. Thereafter, during a replication phase, the master server continuously monitors which of the predetermined files are modified, and sends current copies of the modified files to supplement the shadow copy. This process ensures that the replica servers always have a "mirror image" of the data contained on the master server such that, in the event that the master server ever loses its data, the replica servers could function as the master server, and that the data on replica servers could be utilized, if needed, to restore the current state of the data to the master server.

In one embodiment, the master server comprises a configuration file and a plurality of filters. The configuration file identifies the files that are part of the replication process, and thus, indicates which of the files resident at the master server are to be sent to a replica server during the synchronization and replication phases. The configuration file also identifies a plurality of filters. Each filter is associated with a different one of the replica servers, and comprises information indicating whether a given file at the master server is to be sent, or excluded from being sent, to its corresponding replica server during the synchronization and replication phases.

Initially, during the synchronization phase, the master server loads the configuration file and generates a shadow copy of the predetermined files and sends it to one or more of the replica servers. Thereafter, during normal operation, the master server monitors which of the predetermined files are modified, and identifies those modified files in a journal file at the master server. The master server then applies each of filters identified in the configuration file to the contents of the journal file. This ensures that each modified file is checked against the information in each of the filters. If a filter indicates that a given file is to be sent to its corresponding replica server, the master file sends that file to the replica server. Otherwise, the file is not sent to the replica server. Thus, the present disclosure provides the filters as replica server-specific filters, thereby configuring the master server to send different files to different replica servers to perform the replication process.

Turning to the drawings, FIG. 1 is a block diagram illustrating a computer system configured to operate according to one or more aspects of the present disclosure. As seen in FIG. 1, system 10 comprises a master server 12 that is communicatively connected to one or more client devices 14 via communication network 18, and to a replica server 16 via communication network 20. Generally, the client devices 14 retrieve data and applications from the master server 12, and store data and applications to master server 12. In turn, the master server 12 replicates 22 its data and applications on replica server 16. When needed, the replica server 16 restores 24 the data to master server 12, or alternatively, functions as master server 12.

It should be noted that the illustration of system 10 as comprising only a single master server 12 and a single replica server 14 is for illustrative purposes only. Those of ordinary skill in the art will readily appreciate that the present disclosure is not so limited, and that system 10 may employ multiple master servers 12 and/or multiple replica servers 16, as needed or desired.

The master server 12 comprises a computing device, such as a server. In operation, the master server 12 functions as a central repository for applications and data, and shares its resources among a plurality of connected client devices 14. The client devices 14 are usually provided with a front-end interface that allows the client devices 14 to connect to the master server 12 via network 18, and to interact and manipulate the applications and data executing on master server 12.

Generally, the client devices 14 initiate requests for services provided by the master server 12. Upon receipt of a request, the master server 12 will provide the requested services to the client devices 14. Such services may comprise, for example, resources such as applications and data, which the client devices 14 may or may not modify. In one example, the master server 12 may provide (or be connected to) a database that stores data, as well as a user application configured to allow a user of the requesting client device 14 to modify the data. If the user modifies the data, then that modified data is typically written back to the database so that other users associated with client devices 14 can subsequently access and/or modify the data.

The resources provided by the master server 12, such as the data and applications, are usually persistent. Thus, most operators of master server 12 implement some form of fault tolerance and/or replication mechanism to ensure that selected resources provided by the master server 12 are not lost or corrupted. In this embodiment, for example, the master server 12 replicates or synchronizes the applications and data on or associated with the master server 12 to the replica server 16 via network 20. This replication process synchronizes the data on both the master server 12 and the replica server 16 such that the data on both servers are identical.

More specifically, during an initial synchronization phase, the master server 12 generates a "shadow copy" of its data and application files and sends 22 that shadow copy to the replica server 16. The exact data and applications that are to be sent to the replica server 16 as part of the shadow copy may be predefined in a configuration file stored at the master server 12. Once generated, the master server 12 sends 22 the shadow copy to the replica server 16 where it is stored in a database, for example.

Thereafter, during the replication phase, the master server 12 will continuously monitor the individual files identified in the configuration file and track which of those files are modified by the user. The master server 12 will then send copies of only those relatively few modified files to the replica server 16 for storage in the database. These "intermediate" changes to the files (i.e., those that occur after the synchronization phase) are therefore captured at the replica server 16, and may be thereafter employed to supplement the full shadow copy stored at the replica server.

In more detail, the end result of sending the shadow copy and the modified files to the replica server 16 is that the data and applications files on replica server 16 are synchronized with the data and application files on the master server 12 (i.e., the master server 12 and the replica server 16 are "mirrored"). If the master server 12 were to experience some fault where it could no longer service the client device 14 requests, the replica server 16 could be used as the master server 12 without much delay or disruption (if any) in service to the client devices 14. Additionally, since the data and applications on master server 12 and replica server 16 are synchronized, the data and applications on the replica server 16 may be used to restore 24 master server 12 to a defined state, and/or provision another master server 12 so that it may be used to replace or augment the current master server 12.

Figure 2:
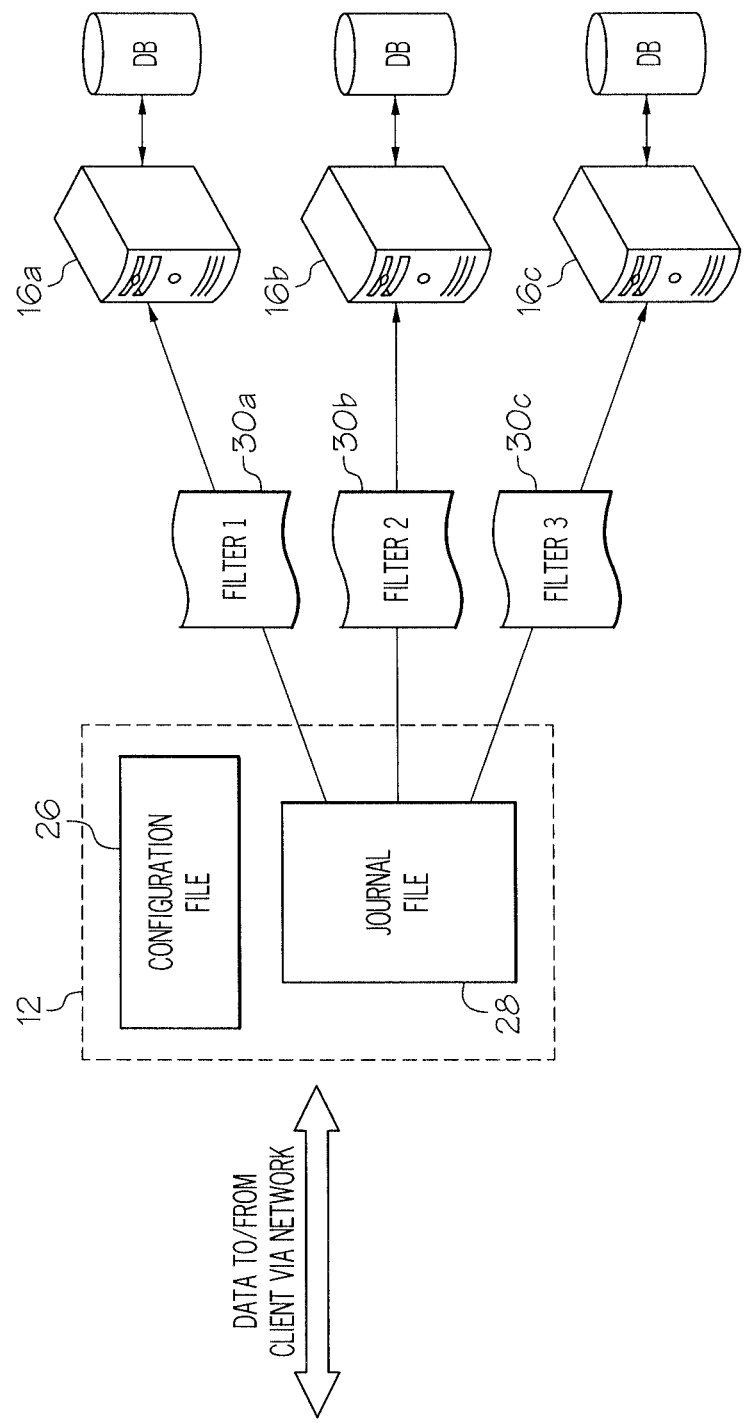
FIG. 2 is a block diagram that illustrates the framework of the disclosure according to one embodiment.

FIG. 2 is a block diagram illustrating the replication process of the present disclosure according to one embodiment. As seen in FIG. 2, the master server 12 comprises a configuration file 26 and a journal file 28. Although these files are shown as being on the master server 12, those of ordinary skill in the art will appreciate that this is for illustrative purposes only. One or both of these files may reside on one or more of the replica servers, or on another server(s), as needed or desired.

The configuration file 26 identifies which of the files (e.g., applications, databases, data files, folders, directories, etc.) are to be replicated on one or more of the replica servers 16*a*-16*c* (collectively, replica servers 16). Generally, the configuration file 26 is associated with a predetermined set of conditions selected by a user. For example, a first configuration file may be associated with a particular day of the week, and thus, is loaded by the master server 12 (i.e., automatically or manually by the user) on that day of the week. Other time-based conditions may specify a particular time, week, or month, for example. Those of ordinary skill in the art will appreciate that many different conditions may be specified, time-based and not, although not all are specifically listed here.

Additionally, the configuration file 26 also identifies a plurality of associated filters that are to be applied to the journal file 28. As stated previously, each filter is associated with a particular one of the replica servers, and identifies whether a given file is/is not to be sent to its corresponding replica server once it has been modified. FIG. 2 shows only a single configuration file 26; however, there may be a plurality of different configuration files 26, each associated with its own set of predetermined conditions, and each identifying its own set of predetermined files and plurality of filters for that particular condition.

The journal file 28 stores indications of which of the files identified in the configuration file 26 have been modified since the last shadow copy was generated and stored at the replica server 16*a*-16*c*. Such indications may comprise, for example, the names and directory locations of the files that were changed; however, any other information regarding the files may also be maintained in journal file 28, as needed or desired.

FIG. 2 also illustrates a plurality of filters 30*a*, 30*b*, and 30*c* (collectively, filters 30). For illustrative purposes only, the following describes the filters 30 as if they were stored on the master server 12. While this is possible in one embodiment, those of ordinary skill in the art should appreciate that the present disclosure is not so limited. In another embodiment, each filter 30*a*, 30*b*, and 30*c* is stored at a corresponding one of the replica servers 16.

Figure 3:
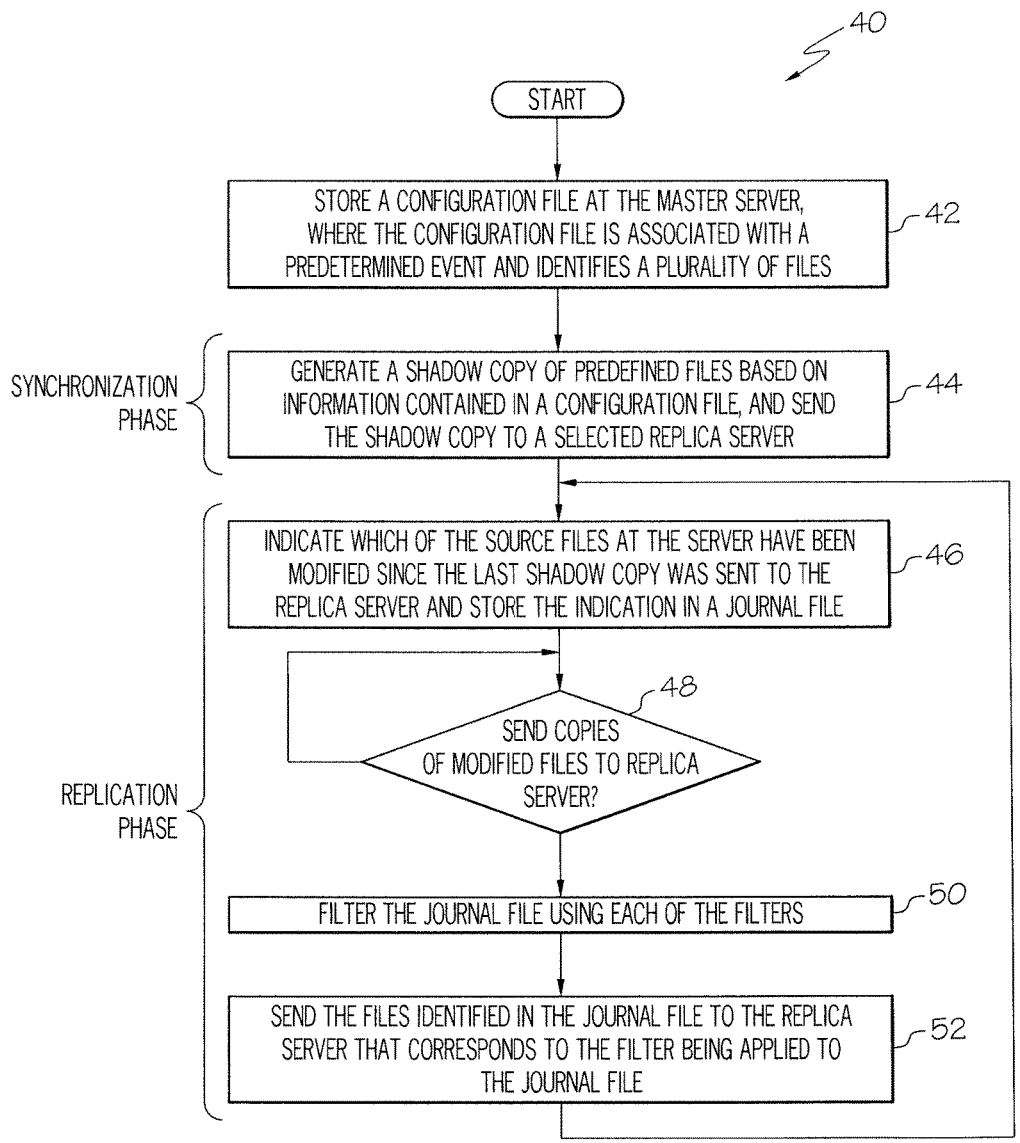
FIG. 3 is a flow chart illustrating the performance of a method according to one embodiment.

As seen in FIG. 3, each filter 30 is associated with the same configuration file 26, and thus, may be invoked whenever the corresponding configuration file is invoked. For example, a user may manually invoke the configuration file 26 for a specific condition. Alternatively, the master server 12 may autonomously invoke a given configuration file 26 upon detecting the condition. Regardless of how the configuration file 26 is invoked, however, the master server 12 may also load the associated set of filters 30 into memory.

Additionally, each filter 30*a*, 30*b*, 30*c* is associated with a different but corresponding one of the replica servers 16*a*, 16*b*, or 16*c*, and in one embodiment, stores setting information for its corresponding replica server 16*a*, 16*b*, or 16*c*. Each filter 30 also comprises information identifying it as an include filter or an exclude filter, thereby indicating whether a given modified file identified in the journal file 28 is to be included or excluded from the replication process when replicating the files at the master server 12 to its corresponding replica server 16a, 16b, or 16c. By way of example, one or more of the filters 30 may comprise information identifying those filters as being include filters. In such cases, the filters 30 would indicate that a given modified file should be included in the replication process, and therefore, copied to its corresponding replica server 16. To facilitate this process, the configuration file 26 may also identify a target directory at the corresponding replica server 16 to which the given modified file should be copied. Thus, during the replication process at master server 12, the contents of the journal file 28 are compared to the information in each individual filter 30a, 30b, and 30c. If the modified file is identified in filter 30a, but not in filters 30b and 30c, then a copy of the modified file is sent to the target directory at replica server 16a but not to replica servers 16b and 16c.

In another example, one or more of the filters 30 may comprise information indicating whether a modified file should be excluded from the replication process. In these cases, the contents of the journal file 28 may be compared to the contents of each filter 30a, 30b, and 30c. If the modified file is identified in both the journal file 28 and in the filter 30a, then the modified file is not copied to the corresponding replica server 16a. However, if the modified file is not identified in one or both of the filters 30b and 30c as being excluded, then the modified file may still be copied to that corresponding replica server 16b, 16c, depending on whether the information in filters 30b, 30c specify any other constraints.

In another embodiment, each of the filters 30a, 30b, and 30c may comprise different information with respect to replicating the files identified in the journal file 28 to their corresponding replica servers 16a, 16b, and 16c. For example, a first filter 30a may comprise size and time information that allows the master server 12 to compare the sizes and modification times of the files identified in the journal file 28 to the sizes and modification times of corresponding files stored on replica server 16a. Any files identified in the journal file 28 having a different size and/or modification time (i.e., a later time) than its corresponding file on the replica server 16a may be sent or backed-up to the replica server 16a. However, any files identified in the journal file 28 having the same size and time as its corresponding file on the replica server 16a would not be sent to the replica server 16a during the replication process as that particular replica server 16a already has the latest copy of the modified file.

A second filter 30b may simply identify the files that are to be included when replicating the data to its corresponding replica server 16b, while a third filter 30c may identify specific files to exclude from the replication process when sending data to its corresponding replica server 16c. Thus, if a modified file is identified in both the journal file 28 and the second filter 30b, the modified file is included in the replication operations and is sent from the master server 12 to the corresponding replica server 16b. Similarly, if the modified file is identified in both the journal file 28 and in the third filter 30c, the modified file is excluded from the replication operations and will not sent to the corresponding replica server 16c.

Thus, in accordance with one or more aspects of the present disclosure, each of the filters 30 may be created to incorporate different information, thereby configuring each filter 30 to have a different filtering effect on the files identified in the journal file 28. Moreover, each of the filters 30 is associated with the same configuration file 26, but with a different replica server 16. Thus, different configuration files 26, each of which may be invoked under a different scenario or condition, may have a plurality of different filters 30 associated with it that causes the files identified in the journal file 28 to be replicated to different replica servers 16 under different, pre-specified conditions.

FIG. 3 is a flow chart that illustrates a method 40 of performing the replication process according to one embodiment. As seen in FIG. 3, the replication process comprises a synchronization phase and a replication phase. Additionally, the master server 12 stores a configuration file 26 in its memory (box 42). The configuration file 26 identifies the files that are to be replicated from the master server 12 to the replica servers 16. The configuration file 26 also identifies a plurality of filters 30. As stated above, each filter in the plurality of filters 30 corresponds to its different replica server 16.

During the initial synchronization phase, the master server 12 will generates a shadow copy of all the predefined files identified in the configuration file 26, and sends the shadow copy to a selected one of the replica servers 16 (box 44). The synchronization phase may be started, for example, by a user who actuates a command button on a user interface on a client device communicatively connected to the master server 12. Thereafter, during the replication phase, the master server 12 continuously monitors the predetermined files identified in the configuration file 28 and determines which of the files have been modified. The master server 12 will then indicate that information in the journal file 28 for each modified file (box 46)

By way of example, the indications may comprise text identifying the name of a file, the name of a directory, the name of a folder, or other identifying information that is written to the journal file 28. Alternatively, the journal file 28 may comprise a list or table with each entry naming a file eligible to be sent to the replica server 16. Upon determining that a file has been modified, the master server 12 could update the journal file 28 by setting a flag associated with the files that have been modified.

Regardless of how the journal file 28 is updated to indicate the modified files, however, the master server 12 will send the modified files indicated in the journal file 28 to one or more of the replica servers 16 (box 48). Particularly, the master server 12 will filter the contents of the journal file 28 with each of the filters 30a, 30b, and 30c (box 50), and send the modified files to whichever replica server 16a, 16b, 16c corresponds to the current filter 30a, 30b, 30c (box 52). For example, the files that meet the criteria specified in filter 30a will be sent to replica server 16a. Similarly, files that satisfy the criteria specified in filters 30b, 30c will be sent to those corresponding replica servers 16b, 16c, respectively. After all of the filters 30 have been applied to the journal file 28, the method 50 simply continues to monitor the files identified in the configuration file, and send only those files that are modified to its corresponding replica server as identified in the configuration file. Thereafter, if the master server 12 experiences a failure, or loses all or part of its data, one or more of the replica servers 16 may be switched into service as the master server, or used to restore the data and files on the master server 12 as previously stated.

Figure 4:
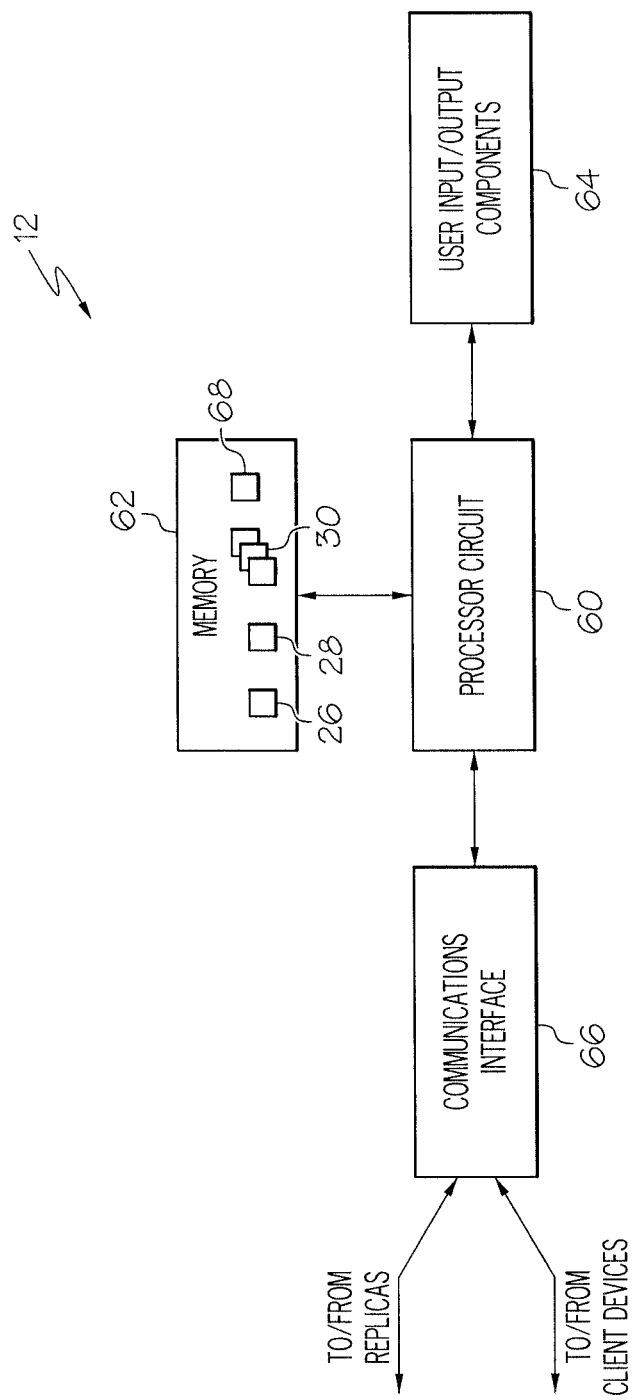
FIG. 4 is a block diagram illustrating some components of a computing device configured according to one embodiment.

FIG. 4 is a block diagram illustrating some of the components of a master server 12 configured according to one or more aspects of the present disclosure. As seen in FIG. 4, master server 12 comprises a processor circuit 60, a memory 62, various user input/output (I/O) components 64, and a communications interface 66.

The processing circuit 60 may be implemented, for example, as one or more programmable microprocessors, hardware, firmware, or a combination thereof. The processing circuit 60 generally controls the operation and functions of the master server 12. Such operations and functions include, but are not limited to, controlling the master server 12 to perform the replication and synchronization operations previously described to ensure that the master server 12 and the replica servers 16 have identical sets of data. Particularly, the processing circuit 60 is programmable, and in one or more embodiments, is programmed to apply each filter 30*a*, 30*b*, 30*c* of the plurality of filters 30 to the contents of a journal file 28 to cause the master server 12 to send copies of the files identified in that journal file 28 to whichever replica server 16*a*, 16*b*, or 16*c* corresponds to the filter 30*a*, 30*b*, 30*c*.

The memory 62 may comprise any non-transitory, solid state memory or computer readable media known in the art. Suitable examples of such media include, but are not limited to, Read Only Memory (ROM), Dynamic Random Access Memory (DRAM), Flash, or a device capable of reading computer-readable media, such as optical or magnetic media. The memory 62 stores programs and instructions, such as configuration file 26, journal file 28, and filters 30, that enable the processing circuit 60 to perform the functions previously described. Specifically, a control application 68 stored in memory 62 may be configured to update the journal file 28 to indicate which of the files have changed, apply each of the plurality of filters 30 as previously described to send whichever modified files that satisfy the criteria included in each filter 30*a*, 30*b*, 30*c* to whichever replica server 16 corresponds to that filter 30*a*, 30*b*, 30*c*.

The user I/O components 64 allow a user, for example, to interact with the master server 12. By way of example only, such components include, but are not limited to, a display monitor, a keyboard, a mouse, or other user input/output device. The communications interface 66 comprises, for example, an ETHERNET interface that allows the master server 12 to communicate data and messages with the client devices 14, as well as each of the replica servers 16, using any of a variety of well-known and well-documented protocols, such as TCP/IP, for example. Other communication interfaces not specifically mentioned herein are also possible.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   storing a configuration file at a master server communicatively connected to a plurality of replica servers, wherein the configuration file comprises information identifying:
      a plurality of predetermined files resident at the master server that are to be sent to a replica server during the synchronization phase and during a replication phase; and
      a plurality of filters, wherein each filter is associated with a corresponding different replica server;
   in a synchronization phase performed at the master server:
      generating a shadow copy of all predetermined files identified in the configuration file, and storing the shadow file at a selected replica server;
   in a replication phase performed at the master server:
      indicating, in a journal file, whether a predetermined file has been modified since the master server generated the shadow copy of the master server; and
      filtering the journal file through each filter of the plurality of filters, wherein each filter comprises criteria defining the filter as being one of an include filter indicating that the predetermined file identified in the journal file is to be included in the replication process to be sent to its corresponding replica server, and an exclude filter indicating that the predetermined file identified in the journal file is to be excluded from the replication process, and wherein for each filter, filtering the journal file comprises sending a current copy of the predetermined file from the master server to its corresponding replica server based on criteria defined in the filter.

2. The computer-implemented method of claim 1 wherein each filter comprises settings for its corresponding replica server.

3. The computer-implemented method of claim 1 wherein for each filter defined as an include filter, the configuration file identifies a target directory at its corresponding replica server, and wherein filtering the journal file comprises the master server sending the current copy of the predetermined file to the target directory at the corresponding replica server.

4. The computer-implemented method of claim 1 wherein each exclude filter identifies predetermined files that are to be excluded from being copied to its corresponding replica server.

5. The computer-implemented method of claim 1 wherein sending a current copy of the predetermined file from the master server to its corresponding replica server based on criteria defined in the filter comprises the master server supplementing the shadow copy stored at the selected replica server with the current copy of the predetermined file indicated as being modified in the journal file.

6. The computer-implemented method of claim 1 further comprising a plurality of configuration files, each configuration file identifying a different set of filters.

7. A computer server comprising:
a communication interface configured to communicate data with a plurality of replica servers via a communications network;
a memory circuit configured to:
store a configuration file comprising information that identifies:
a plurality of predetermined files resident at the computer server that are to be sent to the replica servers during a synchronization phase and during a replication phase; and
a plurality of filters, wherein each filter is associated with a corresponding different replica server; and
store a journal file comprising information that identifies predetermined files that have been modified since the computer server generated a shadow copy of of all predetermined files identified in the configuration file; and
a processing circuit configured to:
in a synchronization phase:
generate a shadow copy of all predetermined files identified in the configuration file for storage at a selected replica server; and
in a replication phase:
update the journal file to identify a predetermined file responsive to determining that the predetermined file has been modified; and
filter the journal file through each of the plurality of filters, wherein each filter comprises criteria defining the filter as being one of an include filter indicating that the predetermined file identified in the journal file is to be included in the replication process to be sent to its corresponding replica server, and an exclude filter indicating that the predetermined file identified in the journal file is to be excluded from the replication process, and wherein for each filter, the processing circuit is configured to send a current copy of the predetermined file to the corresponding replica server based on criteria defined in the filter.

8. The computer server of claim 7 wherein each filter comprises settings for its corresponding replica server.

9. The computer server of claim 7 wherein each include filter specifies which of the predetermined files are to be sent to the corresponding replica server, and wherein each exclude filter specifies which of the predetermined files are to be excluded from being sent to the corresponding replica server.

10. The computer server of claim 7 wherein the processing circuit is configured to load each of the plurality of filters from the corresponding replica server into the memory circuit.

11. The method of claim 1 wherein the configuration file comprises a plurality of configuration files, each being associated with a different predetermined condition defined by a user, and further comprising the master server:
loading a selected configuration file associated with a predetermined condition that has been satisfied; and
loading the plurality of filters identified in the selected configuration file into memory.

12. The method of claim 11 wherein the information in each of the plurality of configuration files identifies, in accordance with the condition associated with the configuration file:
a respective plurality of predetermined files to be sent to a corresponding replica server during the synchronization and replication phases; and
a respective plurality of filters.

13. The method of claim 11 wherein the predetermined condition comprises a time-based condition specified by the user.

14. The method of claim 1 wherein a first filter in the plurality of filters comprises an include filter associated with a first replica server, and wherein a second filter in the plurality of filters comprises an exclude filter associated with a second replica server.

15. The method of claim 1 wherein filtering the journal file further comprises the master server sending the predetermined file to the replica server that corresponds to the a first filter based on a result of a comparison between size and time information associated with the predetermined file and corresponding size and time information identified in the first filter responsive to the first filter being an include filter.

16. A computer program product comprising a non-transitory computer readable storage medium comprising computer readable program code embodied therewith that, when executed by a processing circuit at a master server communicatively connected to a plurality of replica servers, causes the master server to:
store a configuration file at a master server communicatively connected to a plurality of replica servers, wherein the configuration file comprises information identifying:
a plurality of predetermined files resident at the master server that are to be sent to a replica server during the synchronization phase and during a replication phase; and
a plurality of filters, wherein each filter is associated with a corresponding different replica server; and
in a synchronization phase:
generate a shadow copy of all predetermined files identified in the configuration file for storage at a selected replica server; and
in a replication phase:
indicate, in a journal file, whether a predetermined file has been modified since the master server generated the shadow copy; and filter the journal file through each filter of the plurality of filters, wherein each filter comprises criteria defining the filter as being one of an include filter indicating that the predetermined file identified in the journal file is to be included in the replication process to be sent to its corresponding replica server, and an exclude filter indicating that the predetermined file identified in the journal file is to be excluded from the replication process, and wherein for each filter, filtering the journal file comprises sending a current copy of the predetermined file from the master server to the corresponding replica server based on criteria defined in the filter.

17. The computer program product of claim 16 wherein for each filter defined as an include filter, the configuration file identifies a target directory at the corresponding replica server, and wherein the computer readable program code is further configured to control the master server to copy the current copy of the predetermined file to the target directory at the corresponding replica server.

18. The computer program product of claim 16 wherein each exclude filter identifies predetermined files that are to be excluded from being copied to the corresponding replica server.

19. The computer program product of claim 16 wherein the computer readable program code is further configured to control the master server to supplement the shadow copy sent to the selected replica server with a current copy of selected predetermined files indicated as being modified in the journal file.

20. The computer program product of claim 16 wherein the computer readable program code is further configured to control the master server to load each filter from its corresponding replica server into the memory circuit at the master server.

* * * * *